(12) United States Patent
Hyser et al.

(10) Patent No.: US 9,003,003 B1
(45) Date of Patent: Apr. 7, 2015

(54) MANAGING COMPUTER RESOURCES (75) Inventors: Chris D. Hyser, Victor, NY (US);
Cullen E. Bash, Los Gatos, CA (US);
Yuan Chen, Sunnyvale, CA (US);
Daniel Juergen Gmach, Palo Alto, CA (US); Christopher Edward Hoover, Campbell, CA (US); Zhikui Wang, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1023 days.

(21) Appl. No.: 12/559,849

(22) Filed: Sep. 15, 2009

(51) Int. Cl.
*H04L 15/16* (2006.01)
*H04L 29/06* (2006.01)

(52) U.S. Cl.
CPC ..................... *H04L 29/06* (2013.01)

(58) Field of Classification Search
CPC ................................ G06F 15/173; G06F 9/46
USPC .............. 709/223, 224, 225; 700/35, 36, 300
See application file for complete search history.

(56) References Cited

U.S. PATENT DOCUMENTS

| | | | | |
|---|---|---|---|---|
| 7,310,737 | B2* | 12/2007 | Patel et al. | 713/300 |
| 7,958,219 | B2* | 6/2011 | Collins et al. | 709/223 |
| 2003/0115024 | A1* | 6/2003 | Snevely | 703/1 |
| 2007/0260417 | A1* | 11/2007 | Starmer et al. | 702/136 |
| 2009/0228726 | A1* | 9/2009 | Malik et al. | 713/320 |
| 2010/0280680 | A1* | 11/2010 | Angell et al. | 700/300 |
| 2011/0016214 | A1* | 1/2011 | Jackson | 709/226 |
| 2011/0107332 | A1* | 5/2011 | Bash | 718/1 |

OTHER PUBLICATIONS

"Greenhouse Temperature Management"—A.J. Both, Rutgers Univ., Sep. 2008 http://njveg.rutgers.edu/assets/pdfs/ajb/Temperature%20Management.pdf.*

* cited by examiner

*Primary Examiner* — Randy Scott
(74) *Attorney, Agent, or Firm* — Wagner Blecher (57) ABSTRACT

Managing computer resources. Workload state information associated with one or more servers in a data center is accessed by a computer, the workload state information comprises workload placement on one or more servers, cooling conditions of the one or more servers, and performance requirements associated with a data center. Cooling state information of cooling resources associated with the one or more servers are accessed by the computer, the cooling state information comprises cooling conditions of the cooling resources. The workload state information and the cooling state information are compared by the computer. Based on the comparing, the computer generates workload repositioning instructions that instruct repositioning of workload on the one or more servers to meet the performance requirements.

15 Claims, 5 Drawing Sheets

Accesses by a computer workload state information associated with one or more servers in a data center, the workload state information comprising workload placement of workloads on the one or more servers, cooling conditions of the one or more servers, and performance requirements associated with the data center.
405

↓

Accesses by the computer cooling state information of cooling resources associated with the one or more servers, the cooling state information comprising cooling conditions of the cooling resources.
410

↓

Compares by the computer the workload state information and the cooling state information.
415

↓

Based on the comparing, generates by the computer workload repositioning instructions that instruct repositioning of workloads on the one or more servers to meet the performance requirements.
420

↓

Based on the comparing, generates by the computer repositioning instructions that instruct an adjustment in power consumption by said one or more servers to meet said performance requirements.
423

↓

Based on the workload repositioning instructions, generates by the computer cooling resource adjustment instructions that instruct cooling resources to be adjusted to enable the data center to meet the performance requirements.
425

Generates cooling resource adjustment instructions that instruct one or more cooling resources of the cooling resources to be powered down.
430

↓

Sends by the computer the workload repositioning instructions to one or more workload management controllers.
435

↓

Sends by the computer the cooling resource adjustment instructions to one or more cooling controllers.
440

↓

Receives cooling state information from one or more thermal sensors coupled with the one or more servers.
445

MANAGING COMPUTER RESOURCES

FIELD

The field of the present invention relates to computing systems. More particularly, embodiments of the present invention relate to managing computer resources.

BACKGROUND

Computers are widely used today to perform a variety of functions. For example, computers may be used to monitor resources within computer data centers. Computer resources may be arranged to meet service level agreements. A service level agreement is a negotiated agreement between two parties where one is the customer and the other is the service provider; it is a part of a service contract in which the level of service is formally defined. In practice, the term service level agreement is sometimes used to refer to a contracted service to be performed. Of note, the "agreement" relates to the services the customer receives, and not how the service provider delivers that service.

In order to meet the negotiated service contract, it is important that the available computer resources be sufficient to fulfill the contract terms. Conventional solutions to managing computer resources often over-provision these resources to make sure that service level agreements are fulfilled.

BRIEF DESCRIPTION OF THE DRAWINGS

The accompanying drawings, which are incorporated in and form a part of this specification, illustrate embodiments of the present technology for managing computer resources, together with the description, serve to explain principles discussed below:

FIG. 4 is a flowchart 400 of an example method for managing computer resources, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "comparing", "generating", "quantifying", "sending", "receiving", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers. It should be appreciated that in one embodiment, the present technology may be hardware and firmware, while in another embodiment, the present technology may be hardware and software.

Overview

It is desirable that the next generation data centers meet service level agreements (SLAs) while minimizing equipment resources, power consumption, and operation costs. Embodiments of the present technology describe an automated approach to resource management that integrates workload performance management, workload placement, and power/cooling control to right provision computing, power, and cooling resources. This solution enables a significant reduction in the amount of required IT resources and the total energy consumption of the data center while still meeting a hosted application's SLAs.

Most IT performance and resource management solutions attempt to minimize equipment resources, power consumption and operating costs control performance by dynamically adjusting IT resources to react to dynamic workload change. However, these solutions do not have the capability to move and consolidate workloads. Also, traditional workload management does not consider cooling and application performance while directing workload placement. For example, some workload management solutions provide some level of automated live migration of virtual machines within a data center. Some consolidation of workloads takes place, while certain idle machines are suspended. However, the impact of these migrations on the cooling infrastructure is not considered. Other solutions offer an automated IT resource and workload management system for data centers, but the application performance and cooling is not taken into account. Further, more current workload solutions provide a cooling-aware workload placement and migration method, but integrated SLAs and application performance management is not taken into account.

Recently, research has begun on active control strategies for thermal management in data centers. However, since these strategy solutions have not integrated with IT management, they only solve part of the problem and cannot take full advantage of energy savings. On one hand, without the thermal information, IT management solutions cannot exploit the energy efficiency of the physical location and place to place workload. On the other hand, the lack of IT information prevents the thermal management solution from making better or smarter decisions (e.g., slowing down certain cooling resource units' blower speed in response to reduced IT workloads). Finally, asset tracking is done manually, so IT equipment cannot be automatically mapped to cooling, power distribution, or services management. All of these disconnects can result in SLAs violation, waste and increased energy consumption.

Embodiments of the present technology provide a cooling-aware workload placement and migration solution, while integrating workload performance management considerations.

More particularly and in brief, embodiments in accordance with the present technology access workload state information associated with one or more servers in a data center. This workload state information includes, but is not limited to, the location of workloads on the servers, the cooling conditions of these servers, and the performance requirements (as relate to fulfilling SLAs) associated with the data center. Cooling state information of the cooling resources (e.g., air conditioning units) associated with the servers is also accessed. The cooling state information includes, but is not limited to, cooling conditions of the cooling resources. The workload state information and the cooling state information are compared. Based on this comparison, workload repositioning instructions are generated. These workload repositioning instructions instruct the workloads to be repositioned on the servers to meet the performance requirements. Furthermore, based on these workload repositioning instructions, cooling resource adjustment instructions may be generated. These cooling resource adjustment instructions instruct cooling resources to be adjusted to enable the data center to further meet performance requirements. In one embodiment, these workload repositioning instructions and cooling resource adjustment instructions occur approximately concurrently.

Thus, embodiments of the present technology provide for repositioning of workloads on one or more servers based upon factors such as the current workload placement of the servers, cooling conditions of the servers and the cooling resources, and the performance requirements associated with the data center. Based on these repositioning instructions, embodiments further provide for adjustments of cooling resources that enable an SLA to be met while minimizing equipment resources, power consumption, and operating costs.

Example Architecture of a Workload/Cooling Management Hardware Module

Figure 1:
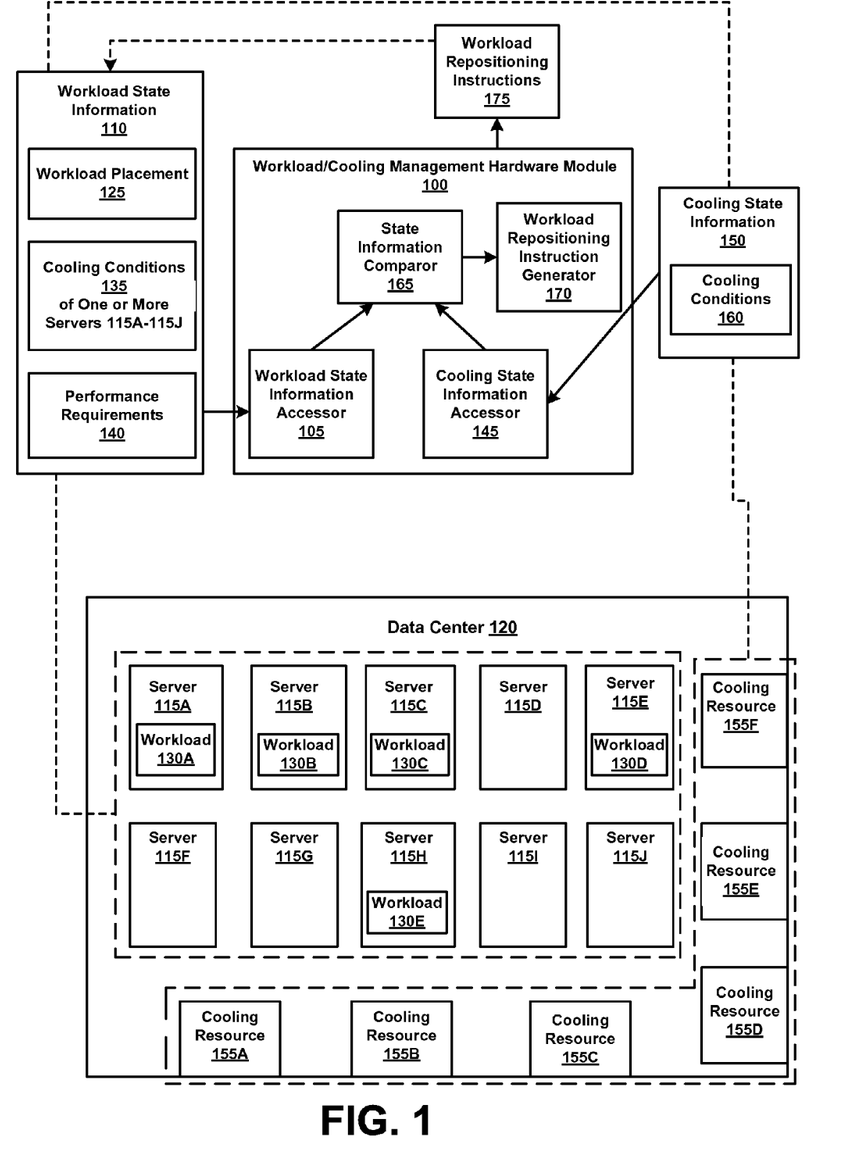
FIG. 1 is a block diagram of an example workload/cooling management hardware module 100, in accordance with embodiments of the present technology.

FIG. 1 is a block diagram of an example of a system workload/cooling management hardware module (WCMHM) 100 upon which embodiments of the present technology can be implemented. The system of FIG. 1 and each of its elements may include elements other than those shown or described herein.

In one embodiment, WCMHM 100 includes a workload state information accessor 105, a cooling state information accessor 145, a state information comparor 165, and a workload re-positioning instruction generator 170.

Additionally, FIG. 1 shows workload state information accessor 105 accessing workload state information 110. Workload statement information 110 includes, but is not limited to, workload placement 125 of workloads 130A, 130B, 130C, 130D and 130E (hereinafter, "workloads 130A-130E") of one or more servers 115A, 115B, 115C, 115D, 115E, 115F, 115G, 115H, 115I and 115J (hereinafter, "one or more servers 115A-115J") in a data center 120, cooling conditions 135 of the one or more servers 115A-115J, and performance requirements 140. The term "workloads" refers to service applications to be performed. In the context of embodiments of the present technology, the term "performance requirements" relates to workloads and refers to services, rules and policies associated with the workloads that are required to be met by the data center. In general, a service is that function that is to be performed by the data center. A rule may refer to a term within an SLA or may refer to an internal company dictate. Likewise, the policies may be a company's general policy to which data center functionality may or shall be adhered.

More specifically, the rules and polices govern the minimum acceptable performance of the services. One rule and policy may relate to response time of the data center. For example, a rule and policy may govern a minimum acceptable response time required for responding to a customer's click of a button during an on-line transaction. Once the customer clicks a button to select an item to purchase, the customer expects this selected item to be placed in a shopping cart. If this item is placed in the shopping cart too slowly, the customer may become frustrated with the wait time and terminate the transaction without purchasing anything. Owners of services that are to be transacted utilizing the data center desire that these minimum performance requirements be met, as described in an SLA.

While FIG. 1 shows workloads 130A-130E on one or more servers 115A-115J, it should be appreciated that there may be more or less workloads in a data center 120 than workloads 130A-130E. Additionally, while FIG. 1 shows servers 115A-115J being accessed, it should be appreciated that there may be more or less servers in a data center 120 than servers 115A-115J. Additionally, it is understood that data center 120 may include more and/or different components than servers 115A-115J and cooling resources 155A-155F. However, for clarity and brevity, just servers 115A-115J and cooling resources 155A-155F are shown as components within data center 120 of FIG. 1.

FIG. 1 also shows cooling state information accessor 145 accessing cooling state information 150. Cooling state information 150 includes cooling conditions 160 of cooling resources 155A, 155B, 155C, 155D, 155E and 155F (hereinafter, "cooling resources 155A-155F"). In one embodiment, a cooling resource is an air conditioning unit. It should be understood that a cooling resource is any component that has an effect on the cooling environment of data center 120. The term "cooling conditions" refers to the state of the cooling resource. For example, but not limited to, whether the cooling resource is powered on or off, and at what temperature the cooling resource is running and/or capable of running. While FIG. 1 shows cooling resources 155A-155F, it should be appreciated that there may be more or less cooling resources in data center 120 than cooling resources 150A-150F.

Further, FIG. 1 shows workload repositioning instructions 175 being generated by workload repositioning instruction generator 170. These workload repositioning instructions 175 may comprise, but are not limited to, instructions to reposition workload on the one or more servers 115A-115J to meet performance requirements 140 and powering on and/or off servers in response to the repositioning of workloads on the one or more servers 115A-115J.

Figure 2:
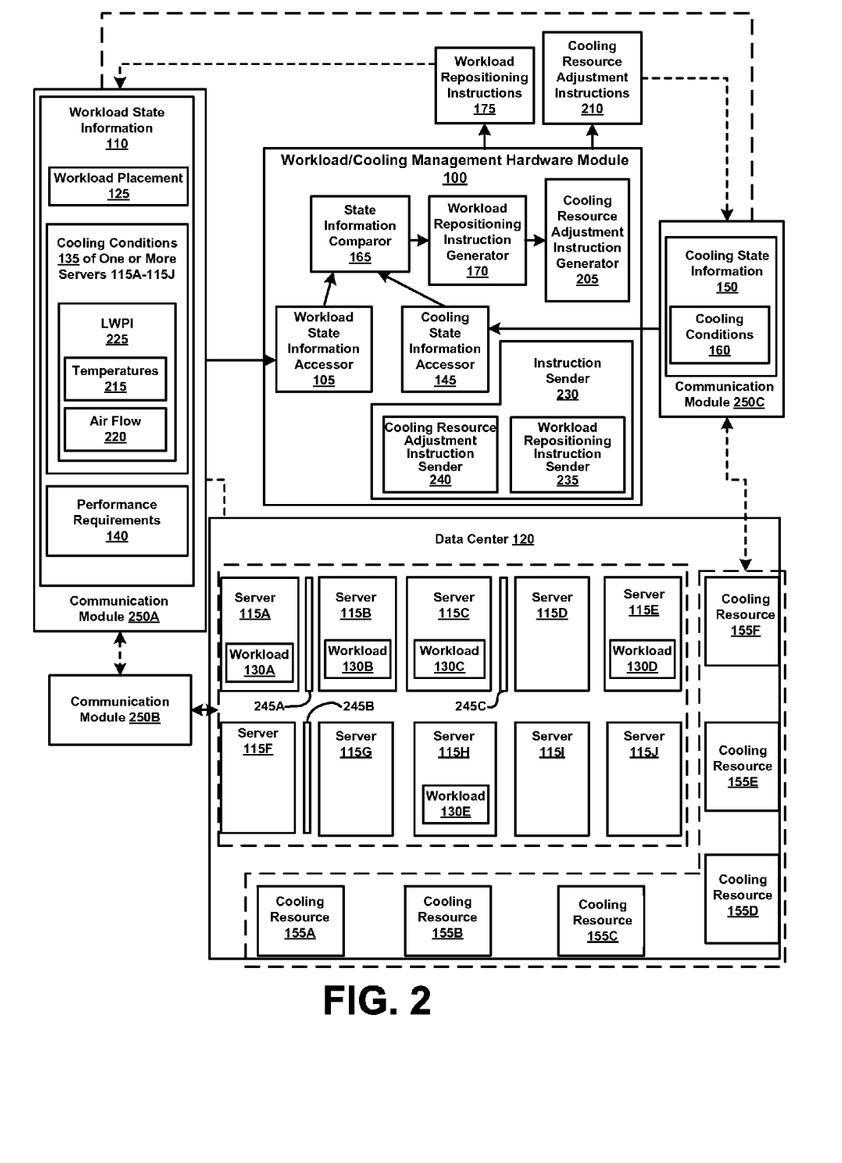
FIG. 2 is a block diagram of an example workload/cooling management hardware module 100, in accordance with embodiments of the present technology.

Referring to FIG. 2, a block diagram of an example of a WCMHM 100 upon which embodiments of the present technology can be implemented is shown. In one embodiment, WCMHM 100 further includes a cooling resource adjustment instruction generator 205, cooling resource adjustment instructions 210 and instruction sender 230. In embodiments of the present technology, cooling resource adjustment instructions 210 include, but are not limited to, instructions to adjust cooling resources 155A-155F (e.g., adjusting set points or valves controlling movement of a cooling medium) and to power cooling resources 115A-155F on and/or off. Instruction sender 230, in one embodiment, includes workload repositioning instruction sender 235. In another embodiment, instruction sender 230 includes cooling resource adjustment instruction sender 240.

FIG. 2 further shows temperatures 215, and air flow 220 within a zone of influence of each cooling resource 155A-155F associated with one or more servers 115A-115J. The phrase "zone of influence", in the context of embodiments of the present technology, refers to an area affected by (temperature is increased or decrease in this area due to the influence of a cooling resources) each cooling resource of cooling resources 155A-155F. In one embodiment, the temperatures 215 and air flow 220 within a zone of influence of each cooling resource 155A-155F associated with one or more servers 115A-115J is quantified as a local workload placement index (LWPI) 225.

Figure 3:
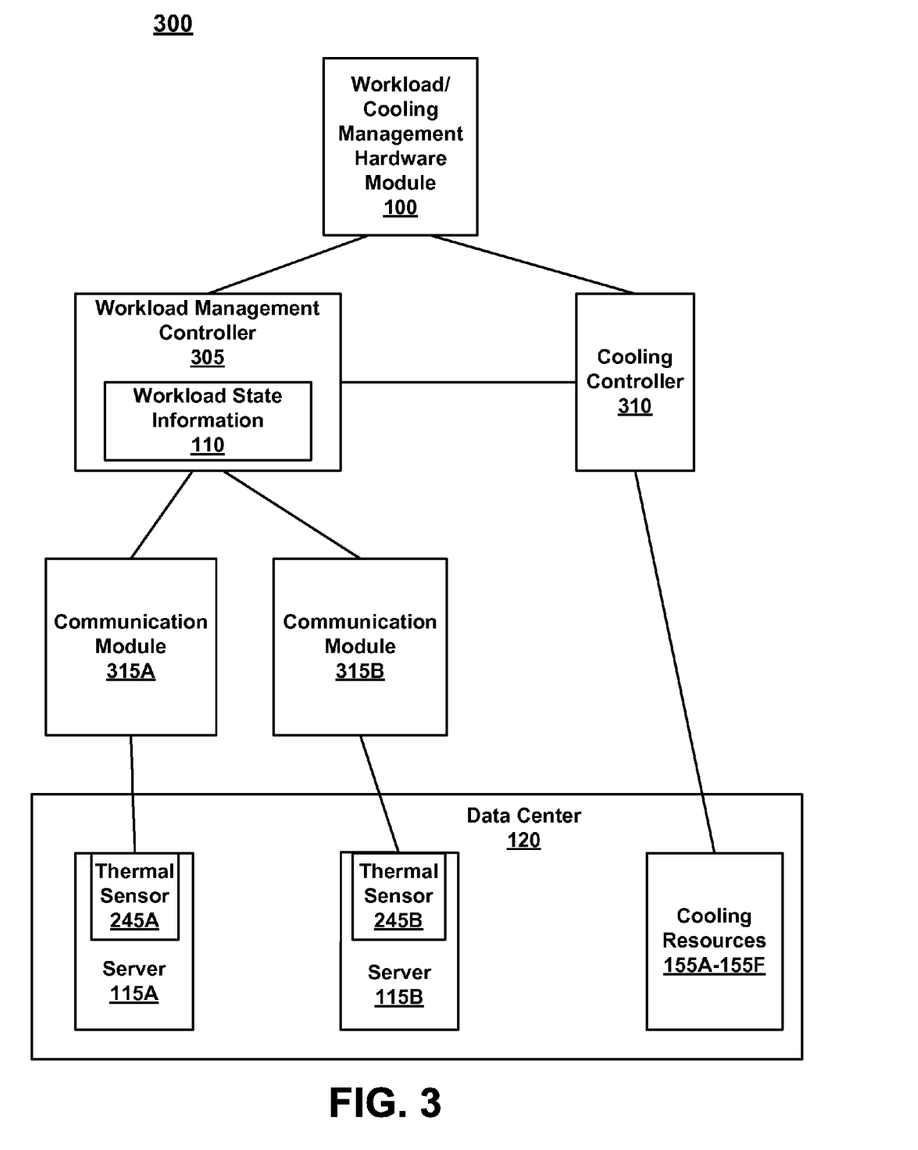
FIG. 3 is a block diagram of an example system 300 for managing workload on servers and managing cooling resources, in accordance with embodiments of the present technology.

FIG. 2 also shows thermal sensors 245A, 245B and 245C (hereinafter, "thermal sensors 245A-245C"). Although thermal sensors 245A-245C are shown, it should be appreciated that embodiments of the present technology may include more or less thermal sensors than thermal sensors 245A-245C. Additionally, FIG. 2 shows thermal sensors 245A-245C as positioned next to, but not coupled with one or more servers 115A-155J. However, thermal sensors 245A-245C may be positioned to be coupled with one or more servers 115A-115J, as shown in FIG. 3.

Additionally, FIG. 2 shows communication modules 250A comprising workload state information 110 and is coupled with WCMHM 100 and data center 120. Communication module 250C comprises cooling state information 150 and is coupled with WCMHM 100 and data center 120. Communication module 250A is shown coupled with communication module 250B and/or data center 120. Communication modules 250A, 250B and 250C enable communication or information between WCMHM 100 and data center 120. For example, communication modules 250A-250C are capable of retrieving and providing information to other components with a system. Additionally, communication modules 150A-150C may store accessed or received information. Of note, while only one communication module 250B is shown couple with communication module 250A and data center 120, it should be appreciated that more than one communication module may be coupled with communication module 250A and data center 120.

Example Operation of a Workload/Cooling Management Hardware Module

More generally, in embodiments in accordance with the present technology, WCMHM 100 is utilized to manage computer resources in a data center, and indirectly, cooling resources positioned outside of, yet coupled with, the data center. Based upon accessed information concerning workload placement, cooling conditions of the servers and the air conditioning units, and performance requirements of the data center, the WCMHM 100 may cause workload to be migrated to different servers of a data center and cause air conditioning units to be turned up and/or down to meet SLAs while also conserving overall resources.

In general, the elements of FIG. 1 are described according to the functions they perform. However, elements may perform functions in addition to those described herein. Also, functions described as being performed by multiple elements may instead be performed by a single element. Similarly, multiple functions described as being performed by a single (e.g., multifunctional) element may instead be divided in some way amongst a number of individual elements.

More particularly, and referring still to FIG. 1, in one embodiment, a workload state information accessor 105 accesses workload state information 110 associated with one or more servers 115A-115J. As described herein, in one embodiment, the workload state information 110 includes workload placement 125 of workloads (e.g., workloads 130A-130E of FIG. 1), cooling conditions 135 of one or more servers 115A-115J, and performance requirements 140 associated with the data center 140. In one embodiment, these performance requirements 140 may require that a response time be as short as possible while using the least amount of resources. However, it should be understood that any number or type of performance requirements may be required.

For example, FIG. 1 shows workload 130A positioned on server 115A, workload 130B positioned on server 115B, workload 130C positioned on server 115C, workload 130D positioned on server 115E and workload 130E positioned on server 115H. Workload state information accessor 105 accesses this workload state information 110 in the form of workload placement 125 information.

Furthermore, in FIG. 1, the workload state information accessor 105 accesses workload state information 110 in the form of cooling conditions 135 of one or more servers 115A-115J. Referring now to FIG. 2, in one embodiment, these cooling conditions 135 for each server are quantified as a local workload placement index (LWPI) 225. The LWPI 225 and its function is well known in the art. The WCMHM 100 accesses this LWPI 225 measurement for each server of the one or more servers 115A-115J. More particularly, the temperatures 215 and the air flow 220 with the zone of influence of each cooling resource 155A-155F (in essence, the cooling efficiency capability for that specific area) is measured by the LWPI 225. The LWPI 225 determines the best available location for placement of a workload based on that location's cooling efficiency capability.

Referring now to FIG. 1, cooling state information accessor 145 accesses cooling state information 150 of cooling resources 155A-155F associated with the one or more servers 115A-115J. As described herein, the cooling state information includes, but is not limited to, cooling conditions 160 associated with the cooling resources 155A-155F. In one embodiment, the cooling state information accessor 145 accesses cooling conditions 160, garnering information as to which cooling resources 155A-155F are currently powered on and off. For example, cooling state information 150 in the form of cooling conditions 160 may show that all cooling resources 155A-155F are powered on and running at a medium level on a scale ranging from low level to high level.

In another example, cooling state information includes information relating to cooling resources positioned outside of data center 120 but coupled with cooling resources 155A-155F. These cooling resources 155A-155F may be monitored and adjusted (as will be described herein) by WCMHM 100 to account for performance requirements 140 and/or individual user policies. In one embodiment, implementation of WCMHM 100 may be associated with situations involving workload movement between cooling zones of influence.

Referring still to FIG. 1, a state information comparor 165 compares the workload state information 110 and the cooling state information 150. This comparison, in essence, integrates all the information garnered from the workload state information accessor 105 and the cooling state information accessor 145. The comparison dynamically enables factors such as workload placement and migration and power and cooling management to be taken into account when determining to which servers of the one or more servers 115A-115J to migrate workloads and which cooling resources 155A-155J to adjust to meet SLAs.

For example, the state information comparor 165 recognizes that while all cooling resources 155A-155F are powered on, only five of the ten servers 115A-115J comprise a workload. Based on the performance requirements 140 of enabling the quickest response time while using the least amount of resources, state information comparor 165 determines that the workloads 130A, 130B and 130E can be migrated to servers 115I, 115J and 115D, respectively, while cooling resources 155A and 155B may be powered off. This is because the zone of influence for cooling resources 155A and 155B comprises the servers 115A, 115B, 115C, 115F, 115G and 115H. Additionally, after migration of workloads 130A, 130B and 130B, it is recognized that servers 115A, 115B, 115F, 115G and 115H have no workloads positioned thereon. Therefore, workload repositioning instructions 175 further includes instructions to power down servers 115A, 115B, 115F, 115G and 115H, thus reducing power consumption.

However, workload 130C remains on server 115C and is within the zone of influence of cooling resource 155B. This situation will be addressed by the cooling resource adjustment instruction generator 205 described below.

Referring still to FIG. 1, in one embodiment, based on the comparing performed by state information comparor 165 above, a workload repositioning instruction generator 170 generates workload repositioning instructions 175. These workload repositioning instructions 175 instruct the repositioning of workloads (e.g., workloads 130A-130E) on the one or more servers 115A-115F to meet the performance requirements 140. In continuing the example begun above, the workloads 130A, 130B and 130E are migrated to the servers 115I, 115J and 115D, respectively. In one embodiment, the workload repositioning instruction generator 170 sends these workload repositioning instructions 175 to a communication module 250A comprising the workload state information 110. This communication module 250A is not only able to communicate the workload state information 110 to WCMHM 100, but is able to receive the workload repositioning instructions 175 and cause migration of the workloads 130A-130F as well as the adjustment in the power consumption of servers (e.g., powering up and/or down of servers) if workload reappears and/or disappears on its own accord. Additionally, communication module 250A may determine initial placement of new workloads as well as place the workloads. In one embodiment, and as shown in FIG. 3, the communication module 250A is a workload management controller 305. However, it should be appreciated that the communication module 250A may be any module that is capable of, but not limited to, causing initial placement of new workloads, migrations in workload among servers, and powering up and/or down servers.

Additionally, FIG. 2 shows communication module 250B, which may communicate information regarding the data center 120 to the communication module 250A, as well as receive workload repositioning instructions 175 from the communication module 250A. Communication module 250B may be any module that is capable of, but not limited to, causing initial placement of new workloads, migrations in workload among servers, and powering up and/or down servers.

FIG. 3 shows communication module 250B as communication modules 315A and 315B coupled with workload management controller 305. In one embodiment, communication modules 315A and 315B are server controllers that are coupled with individual servers 115A and 115B. These server controllers gather information for the server with which it is coupled and communicates this information to the workload management controller 305. Of note, while only two server controllers 315A and 315B are shown to be coupled with two different servers 115A and 115B, respectively, it should be appreciated that any number of server controllers may be present and coupled with any number of separate servers, as a function of the size of the data center. The server controllers may be referred to as "node controllers" and the servers may be referred to as "nodes".

Referring now to FIG. 2, based on these workload repositioning instructions 175, the cooling resource adjustment instruction generator 205 generates cooling resource adjustment instructions 210. In continuing with the example begun above, these cooling resource adjustment instructions 210 adjust cooling resources 155A and 155B to be powered off, while turning up cooling resource 155F to emit more cooling air. In one embodiment, the cooling resource adjustment instruction generator 205 sends these cooling resource adjustment instructions 210 to a communication module 250C comprising the cooling state information 150. This communication module 250C is not only able to communicate the cooling state information 150 to WCMHM 100, but is able to receive the cooling resource adjustment instructions 210 and cause adjustments in the cooling resources 155A-155F. In one embodiment, and as shown in FIG. 3, the communication module 250C is a cooling controller 310. However, it should be appreciated that the communication module 250C may be any module that is capable of causing adjustments in the cooling resources. Additionally, it may be coupled with the communication module 250A that comprises the workload state information 110.

Thus, embodiments of the present technology enable the migration of workload to a more consolidated positioning while powering down servers and/or adjusting the cooling resources to account for the migration. These workload repositioning adjustments, adjustments in a server's power consumption, and cooling resource adjustments enable the reduction of power consumption and thus conserve resources in line with performance requirements 140.

Referring still to FIG. 2, in one embodiment, the WCMHM 100 receives workload state information 110 comprising cooling conditions 135 of the one or more servers 115A-115J from thermal sensors 245A-245C coupled with the one or more servers 115A-115J. In one embodiment, the thermal sensors 245A-245C are only positioned within the vicinity of the one or more servers 115A-115J and not directly attached to the one or more servers 115A-115J. However, in one embodiment, and referring to FIG. 3, the thermal sensors 245A and 245B are shown coupled with servers 115A and 115B, respectively.

Referring now to FIG. 3, a block diagram of an example system 300 for managing workload on servers and managing cooling resources is shown in accordance with embodiments of the present technology. System 300 includes elements of FIGS. 1 and 2. System 300 includes WCMHM 100, workload management controller 305, cooling controller 310 coupled with cooling resources 155A-155F and communication modules 315A and 315B coupled with servers 115A and 115B, respectively. Servers 115A and 115B and cooling resources 155A-155F reside within data center 120.

FIG. 4 is a flowchart of an example method for managing computer resources, in accordance with embodiments of the present technology. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by WCMHM 100 of FIG. 1.

Referring to 405 of FIG. 4 and as described herein, in one embodiment, workload state information 110 associated with one or more servers 115A-115J in a data center 120 is accessed by a computer. The workload state information 110 comprises workload placement 125 of workloads 130A-130E on the one or more servers 115A-115J, cooling conditions 135 of said one or more servers 115A-115J, and performance requirements 140 associated with the data center 120.

Referring now to 410 of FIG. 4 and as described herein, in one embodiment cooling state information 150 of cooling resources 155A-155F associated with the one or more servers 115A-115J is accessed by the computer. The cooling state information 150 comprises cooling conditions 160 of the cooling resources 155A-155F.

Referring now to 415 of FIG. 4 and as described herein, in one embodiment the workload state information 110 and said cooling state information 150 is compared by the computer.

Referring now to 420 of FIG. 4 and as described herein, in one embodiment and based on the comparing of 415, computer workload repositioning instructions 175 are generated by the computer. The computer workload repositioning instructions 175 instruct the repositioning of workloads 130A-130E on the one or more servers 115A-115J to meet said performance requirements 140.

Referring now to 423 of FIG. 4 and as described herein, in one embodiment, and based on the comparing 415, computer workload repositioning instructions 175 are generated by the computer. The computer workload repositioning instructions 175 instruct the power consumption of the one or more servers 115A-115J to be adjusted to meet the performance requirements 140.

Referring now to 425 of FIG. 4 and as described herein, in one embodiment, and based on the workload repositioning instructions 175, cooling resource adjustment instructions 210 are generated by the computer. The cooling resource adjustment instructions 210 instruct cooling resources 155A-155F to be adjusted to enable the data center 120 to meet the performance requirements 140. Referring to 430 of FIG. 4 and as described herein, in one embodiment, the cooling resource adjustment instruction 210 generated instructs one or more cooling resources of cooling resources 155A-155F to be powered down.

Referring now to 435 of FIG. 4 and as described herein, in one embodiment workload repositioning instructions 175 are sent by the computer by one or more workload management controllers 305. Referring now to 440 of FIG. 4 and as described herein, in one embodiment cooling resource adjustment instructions 210 are sent by the computer to one or more cooling controllers 310.

Referring now to 445 of FIG. 4 and as described herein, in one embodiment workload state information 110 comprising cooling condition 135 of one or more servers 115A-115J is received by a computer from one or more thermal sensors 245A and 245B coupled with one or more servers 115A and 115B.

Thus, embodiments of the present technology enable an integration of dynamic resource management, workload placement and migration, and power and cooling management to allow SLAs to be met while minimizing hardware cost and energy consumption.

Example Computer System Environment

Figure 5:
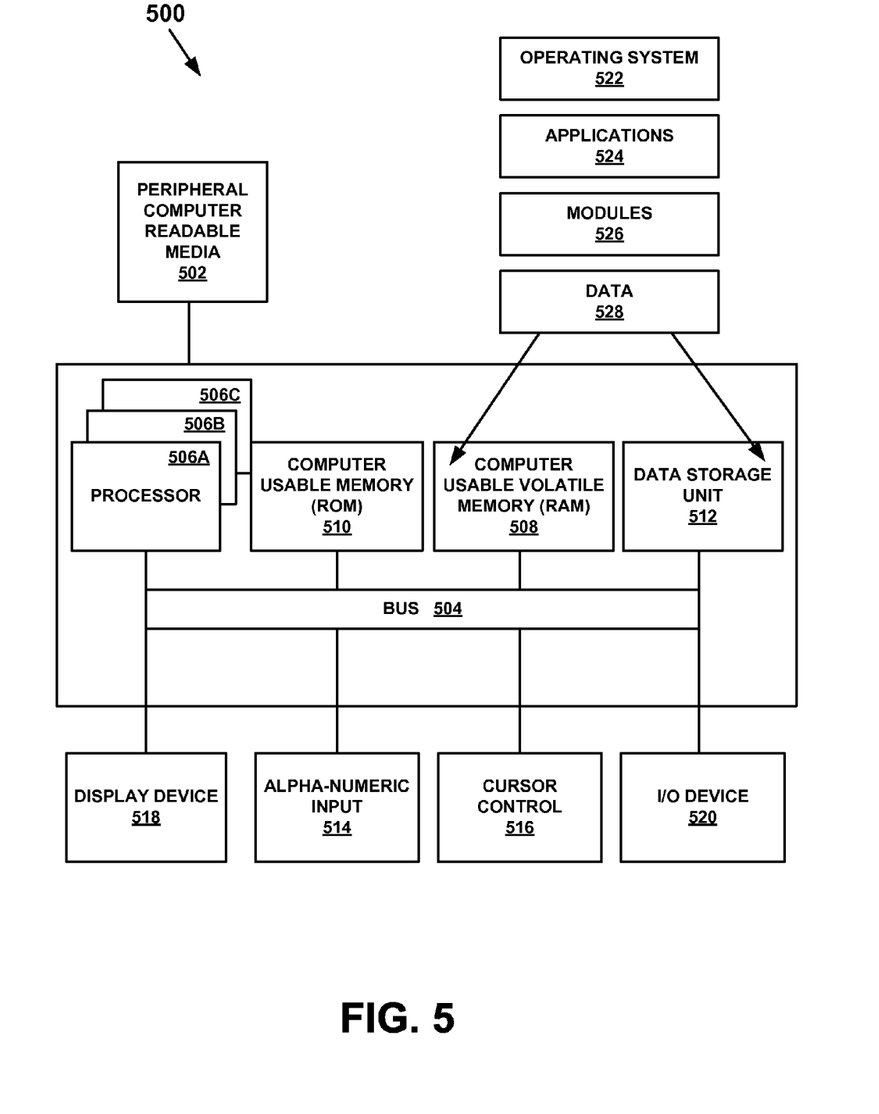
FIG. 5 is a diagram of an example computer system 500 enabling computer resource management, in accordance with embodiments of the present technology.

FIG. 5 illustrates an example computer system 500 used in accordance with embodiments of the present technology. It is appreciated that system 500 of FIG. 5 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 5, computer system 500 of FIG. 5 is well adapted to having peripheral computer readable media 502 such as, for example, a compact disc, and the like coupled therewith.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g., random access memory (RAM), coupled to bus 504 for storing information and instructions for processors 506A, 506B, and 506C.

System 500 also includes computer usable non-volatile memory 510, e.g., read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities.

Referring still to FIG. 5, various other components are depicted for system 500. Specifically, when present, an operating system 522, applications 524, modules 526, and data 528 are shown as typically residing in one or some combination of computer usable volatile memory 508, e.g., random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present invention, for example, is stored as an application 524 or module 526 in memory locations within RAM 508 and memory areas within data storage unit 512.

Computing system 500 is only one example of a suitable computing environment and is not intended to suggest any limitation as to the scope of use or functionality of embodiments of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing computer resources, said method comprising:
   accessing performance requirements associated with a plurality of workloads performed by a plurality of servers in a data center, said performance requirements including rules associated with a service level agreement to be met in performing the workloads;
   accessing workload state information associated with the servers in the data center, said workload state information comprising placement of workloads on said servers and cooling conditions of said servers, wherein said cooling conditions of said servers comprise temperatures and air flow within a zone of influence of each cooling resource associated with said servers;
   accessing cooling state information of cooling resources associated with said servers, said cooling state information comprising cooling conditions of said cooling resources;
   determining, by a computer, based upon said performance requirements, workload state information, and said cooling state information, repositioning of the workloads among the servers that minimizes resource usage in the data center while meeting the performance requirements; and
   determining adjustments to the cooling resources that minimize resource usage in the data center while meeting the performance requirements responsive to the determined repositioning of the workloads among the servers.

2. The method of claim 1, further comprising:
   generating workload repositioning instructions that are to cause the workloads to be repositioned among the servers according to the determined repositioning of the workloads.

3. The method of claim 1, wherein said temperatures and air flow within a zone of influence of each cooling resource associated with said servers are measured by quantifying said cooling conditions as a local workload placement index.

4. The method of claim 2, further comprising:
   sending said workload repositioning instructions to a workload management controller.

5. The method of claim 1, further comprising:
   generating cooling resource adjustment instructions that cause the cooling resources to be adjusted according to the determined adjustments to cooling resource provisioning; and
   sending said cooling resource adjustment instructions to a cooling controller.

6. The method of claim 1, wherein accessing the cooling state information further comprises receiving cooling state information from one or more thermal sensors coupled with said servers.

7. A workload/cooling management hardware module comprising:
   a workload state information accessor to,
      access performance requirements associated with a plurality of workloads performed by a plurality of servers in a data center, said performance requirements including rules associated with a service level agreement to be met in performing the workloads; and
      access workload state information associated with the servers in the data center, said workload state information comprising placement of workloads on said servers and cooling conditions of said servers, wherein said cooling conditions of said servers comprise temperatures and air flow within a zone of influence of each cooling resource associated with said servers;
   a cooling state information accessor to access cooling state information of cooling resources associated with said servers, said cooling state information comprising cooling conditions of said cooling resources;
   a state information comparator to determine, based upon the performance requirements, workload state information, and said cooling state information, repositioning of the workloads among the servers that minimizes resource usage in the data center while meeting the performance requirements; and
   a cooling resource adjustment instruction generator to determine adjustments to the cooling resources that minimize resource usage in the data center while meeting the performance requirements, said cooling resource adjustments being based on said determined repositioning of the workloads among the servers.

8. The workload/cooling management hardware module of claim 7, wherein said temperatures and air flow within a zone of influence of each cooling resource associated with said servers are measured by quantifying said cooling conditions as a local workload placement index.

9. The workload/cooling management hardware module of claim 7, further comprising:

an instruction sender to send instructions to a controller to cause adjustments in components of said data center.

10. The workload/cooling management hardware module of claim 9, further comprising:
a workload repositioning instruction sender to send workload repositioning instructions to a controller to cause repositioning of workloads on said servers.

11. The workload/cooling management hardware module of claim 9, further comprising:
a cooling resource adjustment instruction sender to send cooling resource adjustment instructions to a controller to cause adjustments in said cooling resources.

12. A computer system to manage workload on servers and cooling resources, said computer system comprising:
a memory storing machine readable instructions to:
access performance requirements associated with a plurality of workloads performed by a plurality of servers in a data center, said performance requirements including rules associated with a service level agreement to be met in performing the workloads;
access workload state information associated with the servers in the data center, said workload state information comprising workload placement of workloads on said servers and cooling conditions of said servers, wherein said cooling conditions of said servers comprise temperatures and air flow within a zone of influence of each cooling resource associated with said servers;
access cooling state information of cooling resources associated with said servers, said cooling state information comprising cooling conditions of said cooling resources; and
determine, based upon said performance requirements, workload state information, and said cooling state information, repositioning of the workloads among the servers that minimizes resource usage in the data center while meeting the performance requirements;
determine adjustments to the cooling resources that minimize resource usage while meeting the performance requirements responsive to the determined repositioning of the workloads among the servers; and
a processor to execute the machine readable instructions.

13. The computer system of claim 12, wherein the performance requirements further include services and policies, wherein the services are functions that are to be performed by the data center and the policies pertain to a company's general policy.

14. The computer system of claim 12, wherein the resource usage comprises at least one of energy consumption and information technology (IT) resource usage.

15. The computer system of claim 12, wherein the machine readable instructions are further to:
generate cooling resource adjustment instructions that cause the cooling resources to be adjusted according to the determined adjustments to cooling resource provisioning; and
send the cooling resource adjustment instructions to a controller to cause adjustments in components of said data center to occur.

\* \* \* \* \*